Oct. 8, 1963    H. A. STEINBERG    3,106,201
SOLAR OVEN CONSTRUCTION
Filed Oct. 4, 1961    2 Sheets-Sheet 1

INVENTOR
HYMAN A. STEINBERG
BY *Blum, Moscovitz,*
*Friedman and Blum*

ATTORNEYS.

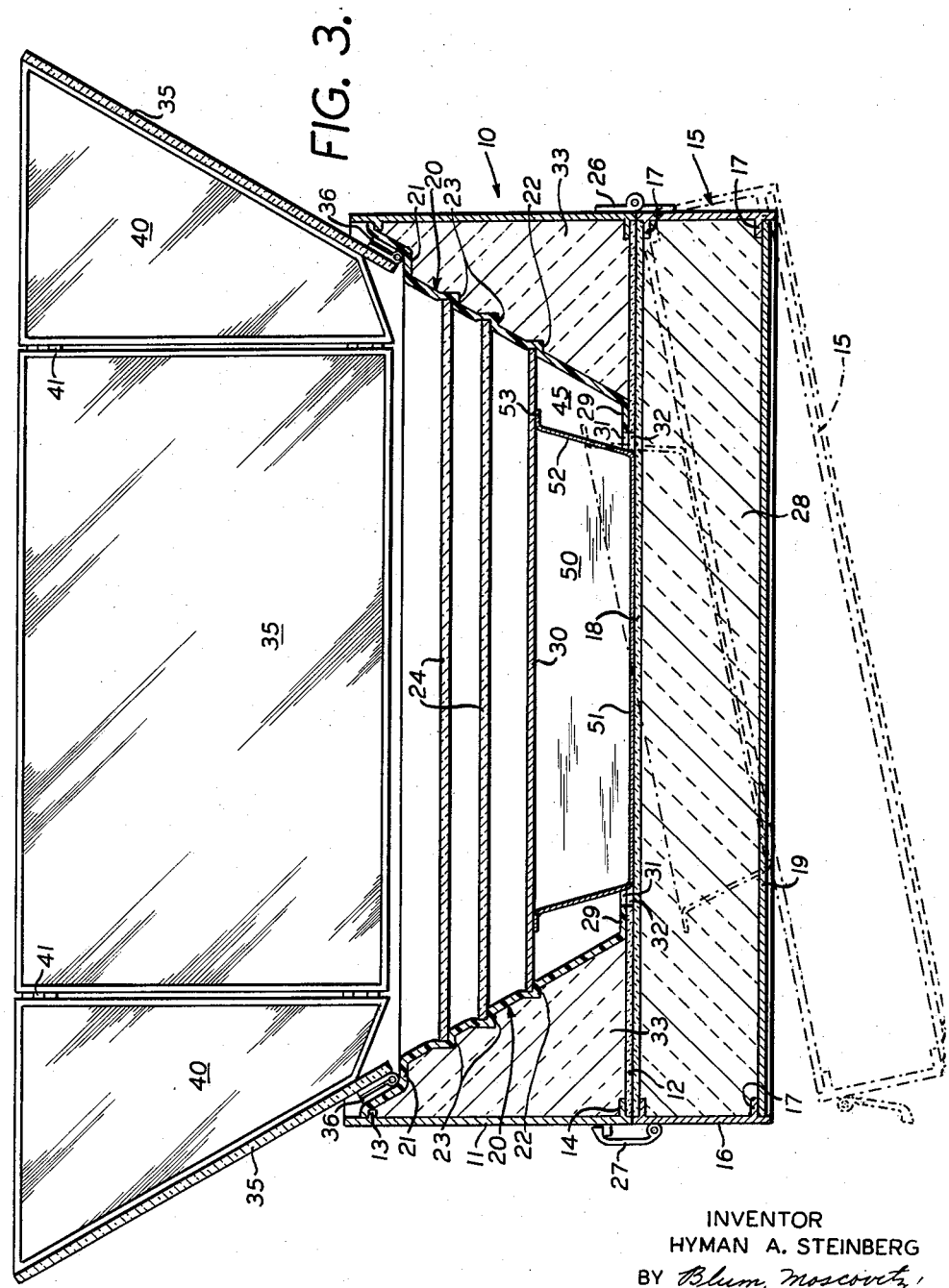

United States Patent Office 3,106,201
Patented Oct. 8, 1963

3,106,201
SOLAR OVEN CONSTRUCTION
Hyman A. Steinberg, Whitestone, N.Y., assignor to Carmer Industries, Inc., a corporation of New Jersey
Filed Oct. 4, 1961, Ser. No. 142,953
12 Claims. (Cl. 126—270)

This invention relates to solar ovens and, more particularly, to improved constructional features for such ovens whereby efficiency is increased, the manufacture is simplified, and the use is simplified. More specifically, the present invention relates to improvements with respect to the solar oven shown, described and claimed in my copending application Serial No. 743,156, filed June 19, 1958, for "Solar Oven" and now Patent No. 3,025,851, issued March 20, 1962.

The solar oven of my copending application is featured by reflective walls extending inwardly of a casing at substantially 120° angles to a flat black collector plate, whereby substantially all of the radiation entering through the open side of the casing, as defined by the reflective walls, is directed solely to the collector plate. In addition, there is a heat receiving chamber within the casing inwardly of and in heat receiving contiguous relation to the collector plate and spaced from the opposite side of the casing, this heat receiving chamber being contiguous to or formed with the collector plate over less than the entire area thereof so as to amplify the relative transfer of heat from the collector plate to the chamber. As further set forth in said copending application, certain definite relations between the dimensions of the heat receiving chamber and those of the collector plate are important in obtaining high temperatures in the heat receiving chamber.

In accordance with the present invention, it has been found that improved results can be obtained by extending the internal side walls of the casing substantially below the collector plate, and surfacing them with a heat reflecting film or coating to form, with the heat receiving chamber, an additional air space below the collector plate and surrounding the food receiving chamber. This air space, due to its contact with the black collector plate, contains a circulating mass of heated air which surrounds the food receiving chamber and thus contributes to the transfer of additional heat to the food receiving chamber by virtue of heat transferred to the side walls of the heating chamber. The heat reflective side wall extensions also contribute to the transfer of heat by reflection of radiation from the collector plate to the heating or food receiving chamber.

Other features of the invention relate to construction details of the solar oven, including a change in the door construction which facilitates placing the food-containing pan, which may be made of aluminium foil or the like into the heat receiving chamber. The internal side walls of the casing which extend inwardly in substantially planar relation with the reflector plates, are made of heat insulating material such as a suitable plastic, these side walls being stepped along their length to provide supports for one or more transparent panes or plates disposed between the open side of the oven casing and the collector plate, as well as to support the collector plate. Furthermore, the present invention provides an improved and simplified handle or carrying construction for the solar oven. It is known that, in the use of such solar ovens, it is customary to tilt the same toward the sun so as to receive the maximum amount of the sun's rays. The angle of tilt varies, so that it is not possible to always maintain the floor of the food receiving pan horizontal. In cooking certain articles which might tend to roll downwardly along the cooking pan or food receiver, it is desirable to prevent such rolling. For this purpose, a feature of the invention is to provide the food-receiving pan with corrugations extending transversely thereof whereby food will be more easily retained in place irrespective of the tilting of the oven.

For an understanding of the principles of the invention, reference is made to the following description of a typical embodiment thereof as illustrated in the accompanying drawings. In the drawings:

FIG. 3 is a sectional view taken substantially along the line 3—3 of FIG. 1.

Figure 1:
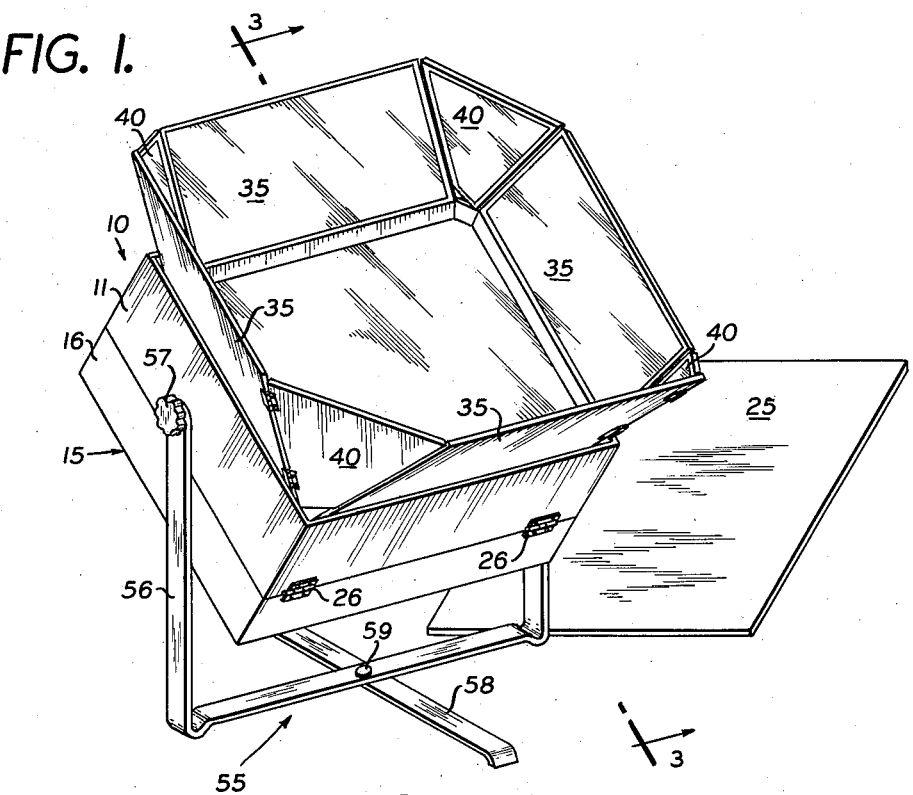
FIG. 1 is a perspective view illustrating a solar oven embodying the present invention as arranged during use or operation.

Referring to the drawings, the oven includes a casing 10 of generally box-like configuration provided with outer side walls 11 and a bottom wall 12. Walls 11 have ribs 13 on their inner surfaces adjacent their upper edges, and ribs 14 on their inner surfaces adjacent their lower edges. The ribs 14, in conjunction with the side walls 11, form a seat for the bottom wall 12 which is preferably of heat insulating material.

A cover 15 is hinged to the casing 10 and comprises side walls 16 having ribs 17 on their inner surfaces adjacent their ends. These ribs 17 serve as seats for an inner wall 18 and an outer wall 19. The inner wall 18 is preferably made of heat insulating material whereas the outer wall 19 may be of metal or any suitable material. Cover 15 is hinged to casing 10 by hinges 26, and suitable interengageable latch means may be provided on the casing and on the opposite end of the cover for latching the cover closed. Cover 15 is preferably packed with heat insulation material 28.

Casing 10 is further provided with inner side walls 20 which slope inwardly at an angle of 30° to the outer side walls 11 of the casing. These inner walls 20 thus extends, considering their inner surfaces, at an angle of substantially 120° to the bottom wall 12 of the casing. Walls 20 are preferably made of heat insulating material, such as a suitable plastic material, and are in what might be termed a stepped formation. The upper edges of the walls are turned outwardly to engage over the ribs 13 at the upper edges of side walls 11. Below the upper edges, the walls 20 are formed with a step 21 for a purpose to be described. At a point some distance above bottom wall 12 of casing 10, the walls 20 are formed with an intermediate step or intermediate steps 23, shown as two in number in the illustrative example. Steps 23 support flat transparent glass or plastic plates 24 which permit solar energy to pass therethrough but block re-radiation of infra-red energy from the collector plate, whereas steps 22 support the flat black metal collector plate 30. The lower ends of the walls 20 are formed with inwardly extending substantially horizontal flanges 29 which define an opening 31 which is congruent with an opening 32 in the bottom wall 12 of casing 10. The space between the inner side walls 20 and the outer side walls 11 is packed with heat insulation material 33. The packings 28 and 33 may be, for example, glass wool or other suitable insulating material. It will be noted that the walls 20 define a cavity extending inwardly from the operatively open outer end of the casing 10 by means of which solar energy may be reflected onto the collector plate 30.

Four reflecting plates or mirrors 35 are hingedly connected, as by means of hinges 36, to the portions of internal side walls 20 extending above the ledges 21. The hinge connection of each mirror 35 is so arranged that, and as seen in FIGS. 1 and 3, in the operative position of the oven the plane of each mirror is at an inner angle of 120° with respect to the collector plate 30. Each mirror 35 supports a generally trapezoidal corner mirror 40, preferably hinged thereto as at 41. The free edges of each trapezoidal mirror 40 engages against the edge of the adjacent mirror 35.

Collector plate 30, the lower portions of internal walls 20, and the bottom wall 12 of casing 10, defines a space to which access is afforded through the congruent openings 31 and 32, when the cover 15 is in the open position shown in dotted line in FIG. 3. Due to the specific angular relationship of the mirrors 35 to the collector plate 30, and to provision of reflecting surfaces on the inner faces of the internal walls 20, substantially all of the solar energy received is directed onto the collector plate 30, where it is converted into thermal energy which is transferred by conduction, convection and radiation to the heating or food receiving chamber 50. Maintenance of a high temperature in the chamber 50 is facilitated by the fact that the space between the inner walls 20 and the outer walls 11 is filled with the heat insulating material 33, and by the fact that the door 15 is packed with heat insulating material 28.

In the particular example shown in the drawings, the heating chamber comprises a portion of collector plate 30 and a food tray or container 50 which is preferably formed of relatively light or thin heat conductive material, such as metal foil. The container 50 may, for example, be formed of aluminium foil. Container 50 includes a bottom wall 51 and side walls 52 which may have flanges as indicated at 53. The height of container 50 is such that, when it is supported upon the door 15, the edges or flanges of the container 50 are in contact with the collector plate 30. As set forth in my said copending application, the area of collector plate 30 enclosed by the flanges 53 of the container 50 amounts advantageously to between one-quarter and three-quarters of the effective area of the collector plate 30. Also, the volume of the food chamber, in cubic inches, is preferably between 0.5 and 1.5 times the effective area, in square inches, of collector plate 30.

The heating of the space enclosed by collector plate 30 and the tray 50 is enhanced by heat transfer through the annular space 45 surrounding the walls 52 of the container 50. Due to the heat reflecting inner surfaces of the extensions of wall 20, heat radiated from that portion of the collector plate beyond the flanges 53 is reflected across the space 45 into the container or tray 52, and is also transferred by convection and conduction through the circulating mass of air in this space 45.

To close the solar oven, the corner mirrors 40 are folded inwardly against the mirrors 35 to which they are hinged, and the four mirrors 35 are then folded into overlapping relation to extend in a plane parallel to the bottom wall 12 of the casing 10. A cover plate 25 may then be placed over the folded-in mirrors and suitably latched in position. Otherwise, the cover plate may have, for example, a friction fit between the side walls 11 of casing 10 so as to rest on the upper edges of the internal walls 20.

Figure 2:
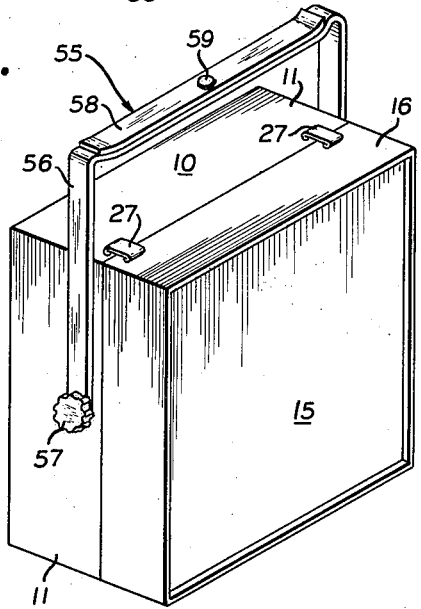
FIG. 2 is a perspective view showing the solar oven in the closed or non-use condition.

To facilitate carrying of the solar oven, the latter is provided with a handle structure generally indicated at 55. This handle structure includes a U-shaped strap 56 which has its free ends pivoted to external walls 11 of casing 10, as indicated at 57. The bight of strap 56 is preferably recessed inwardly, and a cross-bar 58, correspondingly bent, is pivoted to the bight of strap 56 as indicated at 59. In the carrying position of the solar oven, the handle elements occupy the position shown in FIG. 2. When it is desired to set up the oven for operative use, the handle element may occupy the position shown in FIG. 1 wherein bar 58 is swung so that it extends substantially perpendicularly to the bight of the strap 56. This forms a very adequate support for the solar oven. To facilitate proper angular positioning of the oven so that it is facing in the direction of the sun, the pivots 57 may be in the form of knurled nuts so as to firmly clamp the ends of straps 56 against the side walls 11 of the casing 10.

In use, the latches 27 are released, and a pan 50 containing food or the like is placed within the space 45 to form the heat-receiving chamber 50, after which the cover is swung closed to hold the pan 50 in position.

Figure 4:
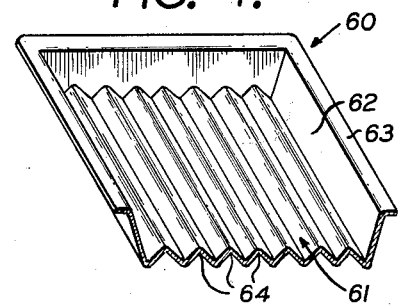
FIG. 4 is a partial perspective view of an improved food-containing pan in accordance with the invention.

As previously stated, the solar oven, except when the sun is directly overhead, is generally tilted, and this may interfere with proper retention of food on the bottom wall of the food container 50. For this purpose, a food container 60 as best seen in FIG. 4 may be used. This food container 60 has a corrugated bottom wall 61, side walls 62, and a flange 63 extending along the upper edges of the side wall 61. Container 60 may be formed of light metal, such as, for example, aluminium foil. It is so positioned within the space 45 that, with respect to the angle at which the oven is tilted, the corrugations 64 of the bottom wall 61 extend transversely. Thereby, otherwise freely movable food items such as frankfurters may be retained in position irrespective of the degree of tilt of the oven.

The described arrangement comprises a practical and fully operative solar oven in which very high temperatures may be quickly attained within the heat-receiving chamber 50. Access to the space 45 is greatly facilitated, and the solar oven is easy to transport and to set up.

While specific embodiments of the invention have been shown and described in details to illustrate the application of the principles of the invention, it will be understood that the invention may embodied otherwise without departing from such principles.

What is claimed is:

1. A solar oven comprising, in combination, an insulated casing having an opening in one side; light reflective internal walls within said casing bounding said opening and extending inwardly therefrom in converging relation to each other; a flat, black, and opaque collector plate extending between the inner faces of said internal walls outwardly of the inner ends thereof and closing the space between said walls, said plate extending substantially parallel to the plane of said opening and being spaced substantially from the opposite side of said casing; the angle between said plate and each of said internal walls being substantially 120°; said collector plate and the portions of said internal walls outwardly thereof defining a cavity receiving radiation entering through said opening; means, including the portions of said internal walls inwardly of said collector plate, defining a space within said casing inwardly of and in heat transfer relation to said collector plate and opening through the opposite wall of said casing; means, including said collector plate, defining a heat receiving chamber within said space; said heat receiving chamber being in contiguous relation with less than the entire area of said collector plate between said internal walls to amplify the relative transfer of heat from said collector plate to said heat receiving chamber; insulation within said casing extending around the outer surfaces of said internal walls; and an insulated cover substantially coextensive with said opposite side of said casing and hinged to said casing and effective to close the said space defined by the internal walls inwardly of said collector plate.

2. A solar oven, as claimed in claim 1, in which said means defining said heat receiving chamber includes chamber walls spaced inwardly from the inwardly extending portions of said internal walls to define therewith, and with said collector plate, a heat transfer space embracing said chamber walls and effective in transfer of heat to said chamber walls from that portion of said collector plate outwardly of said chamber walls.

3. A solar oven, as claimed in claim 1, in which said internal walls are formed of plastic composition material.

4. A solar oven, as claimed in claim 1, in which said internal walls are formed with stepped seating surfaces parallel to the plane of said opening; said collector plate being seated on the lowest one of said stepped seating surfaces.

5. A solar oven, as claimed in claim 4, including at least one transparent plate seated on said stepped seating surfaces outwardly of said collector plate.

6. A solar oven, as claimed in claim 1, including reflecting mirrors hinged to said internal walls so as to open outwardly of the plane of said opening and arranged to be selectively moved between a position closing said casing and a position substantially coplanar with said internal walls; said reflectors, by virtue of their specific angular relation to said collector plate, directing all radiation impinging thereon solely to said plate.

7. A solar oven, as claimed in claim 6, in which the inner surfaces of said internal walls are light reflective to reflect all radiation impinging thereon solely to said collector plate.

8. A solar oven as claimed in claim 1, including a handle structure for carrying the same in a closed position; said handle structure including a U-shaped strap pivotally connected at its free ends to opposite side walls of said casing, and a substantially flat strap pivotally connected to the bight of said U-shaped strap intermediate the ends thereof; said substantially flat strap, in the carrying position of said handle means, extending along the bight of said U-shaped strap; said substantially flat strap being movable to extend substantially perpendicularly to the bight of said U-shaped strap whereby said handle structure may be used as a support structure for said solar oven.

9. A solar oven as claimed in claim 6, including trapezoidal reflector plates each secured at one edge to a corresponding edge of one of said reflecting mirrors and having free edges engageable with the end edge of the laterally adjacent one of said reflecting mirrors to form a reflecting enclosure extending outwardly from said casing in the operative position of said solar oven.

10. A solar oven as claimed in claim 1, including a food receptacle forming part of said heat receiving chamber and comprising a pan formed of heat conductive metal and having a bottom wall surrounded by said walls; said pan being positionable in said space with the outer edges of its side walls in heat conductive contact with said collector plate, and the bottom of the pan being engaged by said cover in the closed position.

11. A solar oven as claimed in claim 10, in which the bottom wall of said pan is formed with transverse corrugations for the purpose of retaining food placed in said pan in position irrespective of tilting of said solar oven.

12. A solar oven, as claimed in claim 2, in which the portions of said internal walls defining said space have heat reflecting inner surfaces.

References Cited in the file of this patent

UNITED STATES PATENTS

| | | |
|---|---|---|
| 681,095 | Baker | Aug. 20, 1901 |
| 965,391 | Little | July 26, 1910 |
| 3,025,851 | Steinberg | Mar. 20, 1962 |
| 3,038,463 | Daymon | June 12, 1962 |

FOREIGN PATENTS

| | | |
|---|---|---|
| 235,563 | Great Britain | Feb. 4, 1926 |

OTHER REFERENCES

Telkes Publication, 1 sheet, Washington Post's magazine section, Parade of April 18, 1954.